(12) United States Patent
Chen et al.

(10) Patent No.: US 11,514,445 B2
(45) Date of Patent: Nov. 29, 2022

(54) INFORMATION SHARING METHODS, APPARATUSES, AND DEVICES

(71) Applicant: ALIPAY (HANGZHOU) INFORMATION TECHNOLOGY CO., LTD., Zhejiang (CN)

(72) Inventors: Yuan Chen, Hangzhou (CN); Renhui Yang, Hangzhou (CN); Xinmin Wang, Hangzhou (CN); Wenyu Yang, Hangzhou (CN); Feng Qian, Hangzhou (CN); Qianting Guo, Hangzhou (CN); Shubo Li, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/364,245

(22) Filed: Jun. 30, 2021

(65) Prior Publication Data
US 2021/0326865 A1    Oct. 21, 2021

(30) Foreign Application Priority Data
Aug. 31, 2020   (CN) .......................... 202010900947.3

(51) Int. Cl.
    *G06Q 20/38*    (2012.01)
(52) U.S. Cl.
    CPC ....... *G06Q 20/389* (2013.01); *G06Q 2220/00* (2013.01)
(58) Field of Classification Search
    CPC ............. G06Q 20/389; G06Q 2220/00; G06Q 20/4016; G06Q 40/02; G06Q 40/025;
    (Continued)

(56) References Cited

U.S. PATENT DOCUMENTS 7,930,228 B1 *   4/2011   Hawkins ................ G06Q 40/04
                                                        705/7.38
7,979,347 B1 *   7/2011   Greener ................. G06Q 20/10
                                                        705/39
(Continued)

FOREIGN PATENT DOCUMENTS

CN    103095825 A    5/2013
CN    106682530      5/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Scott S Trotter
*Assistant Examiner* — Slade E Smith
(74) *Attorney, Agent, or Firm* — Fish & Richardson P.C.

(57) ABSTRACT

Examples in this application disclose information sharing computer-implemented methods, media, and systems. One example computer-implemented method includes obtaining, from an external server at a trusted execution environment (TEE), a trigger instruction, in response to obtaining the trigger instruction, combining, at the TEE, first anti-money laundering (AML) risk information provided by a first institution and second AML risk information provided by a second institution to obtain third AML risk information, where the first AML risk information and the second AML risk information correspond to a user identifier, and sending, from the TEE to the first institution, the third AML risk information.

20 Claims, 6 Drawing Sheets

(58) Field of Classification Search
CPC ........ G06Q 20/10; G06Q 20/24; G06Q 20/26; G06Q 20/3224; G06Q 20/342; G06Q 20/405; G06Q 10/0635; G06Q 10/0639; G06Q 30/018; G06Q 40/04; G06Q 40/06; G06Q 40/08; G06Q 40/12; G06Q 50/26; G06N 20/00; G06F 16/24578; G06F 16/258; G06F 16/9535; G06F 21/6218; G06F 21/629; H04L 67/22; H04L 67/306
USPC .......................................................... 705/44
See application file for complete search history.

(56) References Cited

U.S. PATENT DOCUMENTS

| | | | |
|---|---|---|---|
| 10,904,259 B1* | 1/2021 | Rose | H04L 63/0272 |
| 10,929,936 B1* | 2/2021 | Duranske | H04L 67/306 |
| 2006/0089894 A1* | 4/2006 | Balk | G06Q 40/02 705/35 |
| 2008/0249929 A1* | 10/2008 | Hill | G06Q 40/02 705/39 |
| 2008/0249930 A1* | 10/2008 | Hill | G06Q 20/40 705/39 |
| 2008/0249937 A1* | 10/2008 | Walls | G06Q 20/24 705/42 |
| 2010/0004981 A1* | 1/2010 | Katz | G06Q 40/12 705/30 |
| 2014/0046832 A1* | 2/2014 | Rosen | G06Q 40/00 705/39 |
| 2014/0058914 A1* | 2/2014 | Song | G06Q 20/4016 705/35 |
| 2014/0067636 A1* | 3/2014 | Lawrence | G06Q 40/02 705/35 |
| 2015/0006885 A1 | 1/2015 | Arya | |
| 2015/0039491 A1* | 2/2015 | Snell | G06Q 40/025 705/38 |
| 2016/0035023 A1* | 2/2016 | Snell | G06Q 10/06312 705/38 |
| 2016/0155126 A1* | 6/2016 | D'Uva | G06Q 20/4016 705/44 |
| 2016/0260169 A1* | 9/2016 | Arnold | G06Q 20/023 |
| 2017/0206603 A1* | 7/2017 | Al-Masoud | H04L 9/3236 |
| 2017/0270534 A1* | 9/2017 | Zoldi | G06Q 50/26 |
| 2017/0372483 A1* | 12/2017 | Chronis | G06T 7/194 |
| 2018/0096428 A1* | 4/2018 | Gorenstein | G06Q 40/04 |
| 2018/0240107 A1 | 8/2018 | Andrade | |
| 2018/0373984 A1* | 12/2018 | Katz | G07F 17/3237 |
| 2019/0050861 A1* | 2/2019 | Venkatesh | G06Q 20/3224 |
| 2019/0139144 A1* | 5/2019 | Mishra | G06N 5/04 |
| 2019/0340684 A1* | 11/2019 | Belanger | G06N 7/005 |
| 2020/0026871 A1* | 1/2020 | Mikhailov | G06F 16/252 |
| 2020/0042989 A1* | 2/2020 | Ramadoss | G06Q 20/065 |
| 2020/0106611 A1* | 4/2020 | Bharatam | H04L 9/0844 |
| 2020/0127847 A1 | 4/2020 | Yang et al. | |
| 2020/0143337 A1* | 5/2020 | Conroy | G06Q 40/12 |
| 2020/0145219 A1* | 5/2020 | Sebastian | G06F 21/32 |
| 2020/0145229 A1 | 5/2020 | Li et al. | |
| 2020/0155559 A1* | 5/2020 | Levine | A61P 35/02 |
| 2020/0160344 A1* | 5/2020 | Jevans | G06Q 20/065 |
| 2020/0184084 A1* | 6/2020 | Shockley | H04L 9/3218 |
| 2020/0258181 A1* | 8/2020 | Song | G06Q 20/401 |
| 2020/0265356 A1* | 8/2020 | Lee | G06F 17/18 |
| 2020/0286170 A1* | 9/2020 | Kramer | G06Q 40/02 |
| 2020/0311736 A1* | 10/2020 | Song | G06Q 20/3823 |
| 2020/0366671 A1* | 11/2020 | Larson | G06F 21/31 |
| 2020/0372600 A1* | 11/2020 | Bloy | H04L 9/3239 |
| 2020/0387891 A1* | 12/2020 | Paschini | H04L 9/3239 |
| 2021/0019763 A1* | 1/2021 | Helles | G06Q 20/4014 |
| 2021/0073804 A1* | 3/2021 | Kikinis | G06Q 20/3276 |
| 2021/0126794 A1* | 4/2021 | Forrester | G06Q 30/0185 |
| 2021/0173674 A1* | 6/2021 | Rose | G06Q 20/4016 |
| 2021/0174321 A1* | 6/2021 | Rose | H04L 41/22 |
| 2021/0174347 A1* | 6/2021 | Rose | H04L 63/0428 |
| 2021/0182859 A1* | 6/2021 | Srinivasa Rao | G06N 20/20 |
| 2021/0224922 A1* | 7/2021 | Juban | G06Q 20/4016 |
| 2021/0243027 A1* | 8/2021 | Gupta | H04L 9/3265 |
| 2021/0264018 A1* | 8/2021 | Helles | G06Q 20/363 |
| 2021/0287173 A1* | 9/2021 | Rose | H04L 63/0272 |
| 2021/0288951 A1* | 9/2021 | Rose | H04L 63/0861 |
| 2021/0288966 A1* | 9/2021 | Rose | H04L 63/0272 |

FOREIGN PATENT DOCUMENTS

| | | |
|---|---|---|
| CN | 108230109 A | 6/2018 |
| CN | 108519981 | 9/2018 |
| CN | 108537667 | 9/2018 |
| CN | 108712429 | 10/2018 |
| CN | 109460405 | 3/2019 |
| CN | 109886695 A | 6/2019 |
| CN | 111090874 | 5/2020 |
| CN | 111092726 | 5/2020 |
| CN | 111339206 A | 6/2020 |
| CN | 111400761 A | 7/2020 |
| CN | 111447238 A | 7/2020 |
| CN | 111526154 A | 8/2020 |

OTHER PUBLICATIONS

Nakamoto, "Bitcoin: A Peer-to-Peer Electronic Cash System," www.bitcoin.org, 2005, 9 pages.

Extended European Search Report in European Application No. 21182754.8, dated Dec. 23, 2021, 9 pages.

Wang et al., "Risk assessing and privacy-preserving scheme for privacy leakage in APP," Journal on Communications, 2019, 40(5):13-23 (with English abstract).

Al-Breiki et al., "Trustworthy Blockchain Oracles: Review, Comparison, and Open Research Challenges," May 2020, IEEE Access, vol. 8, pp. 85675-85685.

* cited by examiner

INFORMATION SHARING METHODS, APPARATUSES, AND DEVICES

CROSS-REFERENCE TO RELATED APPLICATIONS

This application claims priority to Chinese Patent Application No. 202010900947.3, filed on Aug. 31, 2020, which is hereby incorporated by reference in its entirety.

TECHNICAL FIELD

The present specification relates to the field of blockchain technologies, and in particular, to information sharing methods, apparatuses, and devices.

BACKGROUND

A blockchain is a new application mode of computer technologies such as distributed data storage, point-to-point transmission, a consensus mechanism, and an encryption algorithm. A blockchain is a chained data structure obtained by combining data blocks in chronological order, and uses a cryptographic method to ensure that a distributed ledger cannot be tampered with or forged. Because a blockchain has features such as de-centralization, non-tampering, and autonomy, the blockchain is attracting more attention and more widely applied.

SUMMARY

Embodiments of the present specification provide information sharing methods, apparatuses, and devices, so as to solve a problem that AML risk information verification cannot be proactively triggered at a timed moment in an existing information sharing method.

To solve the previously-mentioned technical problem, the embodiments of the present specification are implemented as described below.

Some embodiments of the present specification provide an information sharing method, where the method is applied to a privacy computing unit and the method includes: obtaining a trigger instruction sent by an external server; in response to the trigger instruction, combining first AML risk information provided by a first institution and second AML risk information provided by a second institution to obtain combined third AML risk information, where the combined first AML risk information and second AML risk information correspond to the same user identifier; and sending the third AML risk information to the first institution.

Some embodiments of the present specification provide an information sharing triggering method, and the method includes: An external server obtains time information used to indicate a current moment, where timed triggering logic is deployed on the external server; determines whether the time information satisfies a timed triggering rule in the timed triggering logic, to obtain a determining result; sends a trigger instruction to a privacy computing unit if the determining result indicates that the time information satisfies the timed triggering rule in the timed triggering logic, where the trigger instruction is used to trigger the privacy computing unit to combine first AML risk information provided by a first institution and second AML risk information provided by a second institution to obtain combined third AML risk information, where the combined first AML risk information and second AML risk information correspond to the same user identifier; and sends the third AML risk information to the first institution.

Some embodiments of the present specification provide an information sharing apparatus, where the apparatus is applied to a privacy computing unit and the apparatus includes: a trigger instruction acquisition module, configured to obtain a trigger instruction sent by an external server; a risk information combination module, configured to: in response to the trigger instruction, combine first AML risk information provided by a first institution and second AML risk information provided by a second institution to obtain combined third AML risk information, where the combined first AML risk information and second AML risk information correspond to the same user identifier; and a combination result sending module, configured to send the third AML risk information to the first institution.

Some embodiments of the present specification provide an information sharing triggering apparatus, and the apparatus includes: a time information acquisition module, configured to obtain time information used to indicate a current moment for an external server, where timed triggering logic is deployed on the external server; a first determining module, configured to determine whether the time information satisfies a timed triggering rule in the timed triggering logic, to obtain a determining result; and a trigger instruction sending module, configured to send a trigger instruction to a privacy computing unit if the determining result indicates that the time information satisfies the timed triggering rule in the timed triggering logic, where the trigger instruction is used to trigger the privacy computing unit to combine first AML risk information provided by a first institution and second AML risk information provided by a second institution to obtain combined third AML risk information, where the combined first AML risk information and second AML risk information correspond to the same user identifier; and send the third AML risk information to the first institution.

Some embodiments of the present specification provide an information sharing device, including: at least one processor; and a memory communicatively connected to the at least one processor, where the memory stores instructions that can be executed by the at least one processor, and the instructions are executed by the at least one processor, to enable the at least one processor to: obtain a trigger instruction sent by an external server; in response to the trigger instruction, combine first AML risk information provided by a first institution and second AML risk information provided by a second institution to obtain combined third AML risk information, where the combined first AML risk information and second AML risk information correspond to the same user identifier; and send the third AML risk information to the first institution.

Some embodiments of the present specification provide an information sharing triggering device, including: at least one processor; and a memory communicatively connected to the at least one processor, where the memory stores instructions that can be executed by the at least one processor, and the instructions are executed by the at least one processor, to enable the at least one processor to: obtain time information used to indicate a current moment for an external server, where timed triggering logic is deployed on the external server; determine whether the time information satisfies a timed triggering rule in the timed triggering logic, to obtain a determining result; and send a trigger instruction to a privacy computing unit if the determining result indicates that the time information satisfies the timed triggering rule in the timed triggering logic, where the trigger instruction is used to trigger the privacy computing unit to combine first AML risk information provided by a first institution and second AML risk information provided by a second institution to obtain combined third AML risk information, where the combined first AML risk information and second AML risk information correspond to the same user identifier; and send the third AML risk information to the first institution.

Some embodiments of the present specification can achieve the following beneficial effects: The trigger instruction sent by the external server is obtained; in response to the trigger instruction, the first AML risk information provided by the first institution and the second AML risk information provided by the second institution are combined to obtain the combined third AML risk information, where the combined first AML risk information and second AML risk information correspond to the same user identifier; and the third AML risk information is sent to the first institution. A matching and combination process of AML risk information can be triggered by using the external server, so as to satisfy a need of proactively triggering AML risk information verification of a user.

BRIEF DESCRIPTION OF DRAWINGS

To describe technical solutions in the embodiments of the present specification or in the existing technology more clearly, the following briefly describes the accompanying drawings required for describing the embodiments or the existing technology. Clearly, the accompanying drawings in the following description merely show some embodiments of the present specification, and a person of ordinary skill in the art can still derive other drawings from these accompanying drawings without creative efforts.

DESCRIPTION OF EMBODIMENTS

Figure 1:
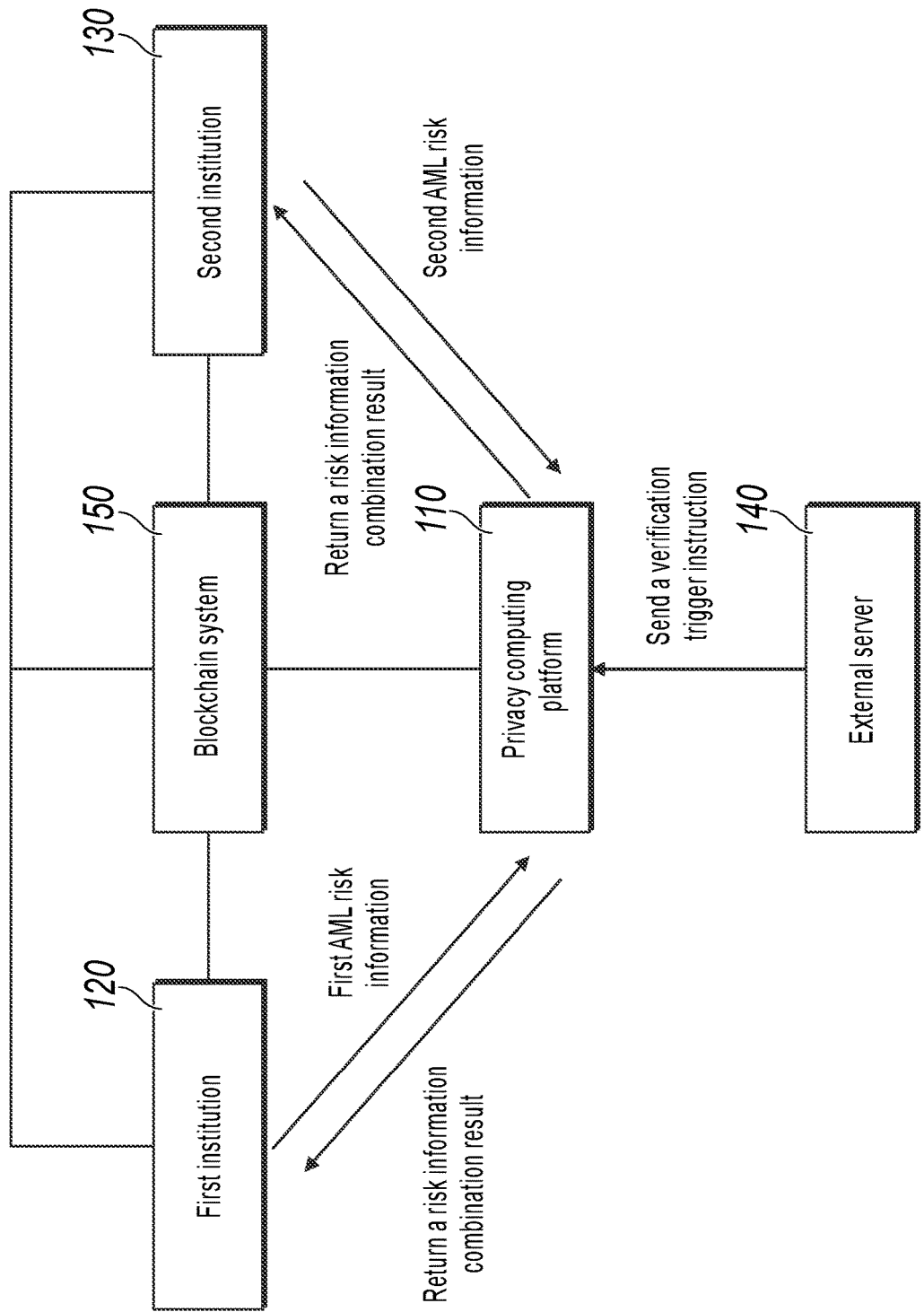
FIG. 1 is a schematic diagram illustrating a system architecture of an information sharing method, according to some embodiments of the present specification.

To make the objectives, technical solutions, and advantages of one or more embodiments of the present specification clearer, the following clearly and comprehensively describes the technical solutions of one or more embodiments of the present specification with reference to corresponding accompanying drawings and one or more specific embodiments of the present specification. Clearly, the described embodiments are merely some but not all of the embodiments of the present specification. All other embodiments obtained by a person of ordinary skill in the art based on the embodiments of the present specification without creative efforts shall fall within the protection scope of one or more embodiments of the present specification.

Data sharing is often required by institutions to process services. A single institution is often unable to obtain enough information to process a service, and needs to obtain information from other institutions. For example, many countries require financial institutions to provide anti-money laundering audit results in the requirements of anti-money laundering (AML) compliance. At present, many national central banks and large financial institutions have tried to improve efficiency and accuracy by using blockchain in the field of anti-money laundering and to satisfy regulatory requirements. Meanwhile, data (as resources) mobility and accessibility are the foundation of many data applications and industry development. However, privacy protection in data exchange and sharing is a challenge to industry development. The following still uses the previously-mentioned anti-money laundering as an example for description.

Anti-money laundering is a measure to prevent money laundering activities that cover up and conceal sources and nature of earnings from drug crimes, organized crimes of a gangdom, terrorist crimes, smuggling crimes, corruption and bribery crimes, and crimes against financial management order by using various means. Common money laundering paths involve fields such as banking, insurances, securities, and real estate. Most anti-money laundering efforts include three core aspects:

1. Customer identification system. During establishment of a service relationship or a transaction with a customer, the subject of the anti-money laundering obligation shall verify and record an identity of the customer based on an actual and valid identity card, and update the customer's identity information in time during the existence of the service relationship.

2. Large Suspicious transaction report (STR) system. Illegal capital flows are usually characterized by large amounts and abnormal transactions. Therefore, the STR is stipulated in laws. For the amount of transactions that reached certain standard and abnormal transactions without a legitimate purpose, financial institutions are required to report to the anti-money laundering administrative department in a timely method for the purpose of tracing illegal crimes.

3. Customer identity information and transaction record retention rules. The retention of customer identity information and transaction records means that financial institutions take the necessary measures to save customer identity information and transaction information for a certain period of time based on laws, so as to provide evidence for tracing illegal crimes.

The customer identity identification system, which is commonly referred to as Know Your Customer (KYC), refers to obtaining customer-related identification information, including knowing the identity of the customer when establishing a service with the customer, knowing the purpose of the transaction, knowing the source and whereabouts of the capital, knowing the daily service activities and financial transactions of the customer, etc., which are the bases for anti-money laundering.

The STR system refers to a system that a financial institution reports suspicious transactions to the central bank or the administration of foreign exchange after discovering the suspicious transactions. In addition, the financial institution is obliged to review the suspicious transactions. When a suspected crime is discovered, the financial institution needs to report it to the local police department in time. After a financial institution reviews a suspicious transaction of a user, if determining that a transaction risk of the user is high, the financial institution can label the user with a crime label in the STR. Common STR crime labels include, for example, drug crime, organized crime of a gangdom, terrorist crime, smuggling crime, corruption and bribery crime, crime against financial management order, financial fraud crime, and money-laundering crime.

All financial institutions have the obligation to review suspicious transactions. However, information about transactions related to the same user and information about the user are often different among different financial institutions. In this case, STR crime labels labeled by different financial institutions after performing suspicious transaction analysis on the same user may also be different. A better way for a financial institution to label an STR crime label to a user more accurately is to obtain an STR crime label labeled to the same user by another (or more) financial institution. Therefore, there is a need to share STR crime labels of the same user among different financial institutions.

In the previously-mentioned example, STR crime label information sharing is actually also one of AML risk information sharing. AML risk information sharing mainly refers to sharing information related to customer money-laundering risks generated and identified by anti-money laundering policies and procedures, including sharing of customer money-laundering risk level, customer STR crime type code, customer suspicious behavior information, and other information related to money-laundering risk. The following uses the STR crime type code as an example to describe an implementation process of sharing an STR crime label of the same user between different financial institutions, and implementation processes of sharing other AML risk information are similar.

For another example, a customer money-laundering risk level is used as an example. Money-laundering risk levels labeled by different financial institutions after performing suspicious transaction analysis on the same user may also be different. For example, a money-laundering risk labeled by institution A to user A is high, and a money-laundering risk labeled by institution B to user A is medium. A better way for a financial institution to label a money-laundering risk label to a user more accurately is to obtain a money-laundering risk label labeled to the same user by another (or more) financial institution. Therefore, there is a need to share money-laundering risk labels of the same user among different financial institutions.

Customer suspicious behavior information in AML risk information sharing is similar.

The technical solutions provided in the embodiments of the present specification are described in detail below with reference to the accompanying drawings.

FIG. 1 is a schematic diagram illustrating a system architecture of an information sharing method, according to some embodiments of the present specification. As shown in FIG. 1, roles in FIG. 1 include: a privacy computing platform 110, a first institution 120, a second institution 130, an external server 140, and a blockchain system 150. The first institution 120 can be a sales agency, the second institution 130 can be a financial institution, and the external server 140 can send a trigger instruction at a timed moment to the privacy computing platform 110 to trigger the privacy computing platform 110 to perform AML risk information combination, and share a combined combination result with each institution. The first institution 120 can directly receive user information, so as to complete certain processing work based on the user information, such as the previously-mentioned reviewing suspicious transactions. In addition, the first institution 120 can provide a result of reviewing a suspicious transaction externally, that is, an STR crime label, or provide the STR crime label externally. Both the first institution 120 and the second institution 130 can be connected to the blockchain system 150, and can be connected to the privacy computing platform 110. By using the privacy computing platform 110, predetermined rules can be executed in a trusted security computing environment, thereby completing AML risk information sharing such as STR crime labels. After receiving first AML risk information of the first institution 120, the privacy computing platform 110 can combine the first AML risk information with second AML risk information in the second institution 130 corresponding to a user identifier of a user corresponding to the AML risk information of the first institution 120. A combined combination result can be returned to the first institution 120 and/or the second institution 130.

The following describes the information sharing method embodiments of the present specification with reference to the previously-mentioned examples of AML risk information sharing. For ease of description, the roles in the example are no longer labeled with reference numerals. That the risk information is specifically an STR crime label is used as an example. The first institution and the second institution can respectively label an STR crime label to a user based on anti-money laundering audit capabilities of the first institution and the second institution. The anti-money laundering capabilities of the first institution and the second institution may be different, and the content and quality of user information and historical transactions may also be different. In this case, the first institution and the second institution may respectively label different STR crime labels to user A. For example, the STR crime label labeled by the first institution to user A is [drug crime, organized crime of a gangdom], and the STR crime label labeled by the second institution to user A is [smuggling crime]. To obtain more accurate STR crime labels, the STR crime labels of the same user can be shared between the first institution and the second institution. That risk information is specifically a money-laundering risk level is used as an example. The first institution and the second institution can respectively label money-laundering risk levels to a user based on the anti-money laundering audit capabilities of the first institution and the second institution. Similarly, the first institution and the second institution respectively label different money-laundering risk levels to user A. For example, the money-laundering risk level label labeled by the first institution to user A is [high risk level], and the money-laundering risk level label labeled by the second institution to user A is [medium risk level]. To obtain a more accurate money-laundering risk level, the first institution and the second institution can share money-laundering risk level labels of the same user.

Next, an information sharing method provided in the embodiments of the present specification is specifically described with reference to the accompanying drawings.

Embodiment 1

Figure 2:
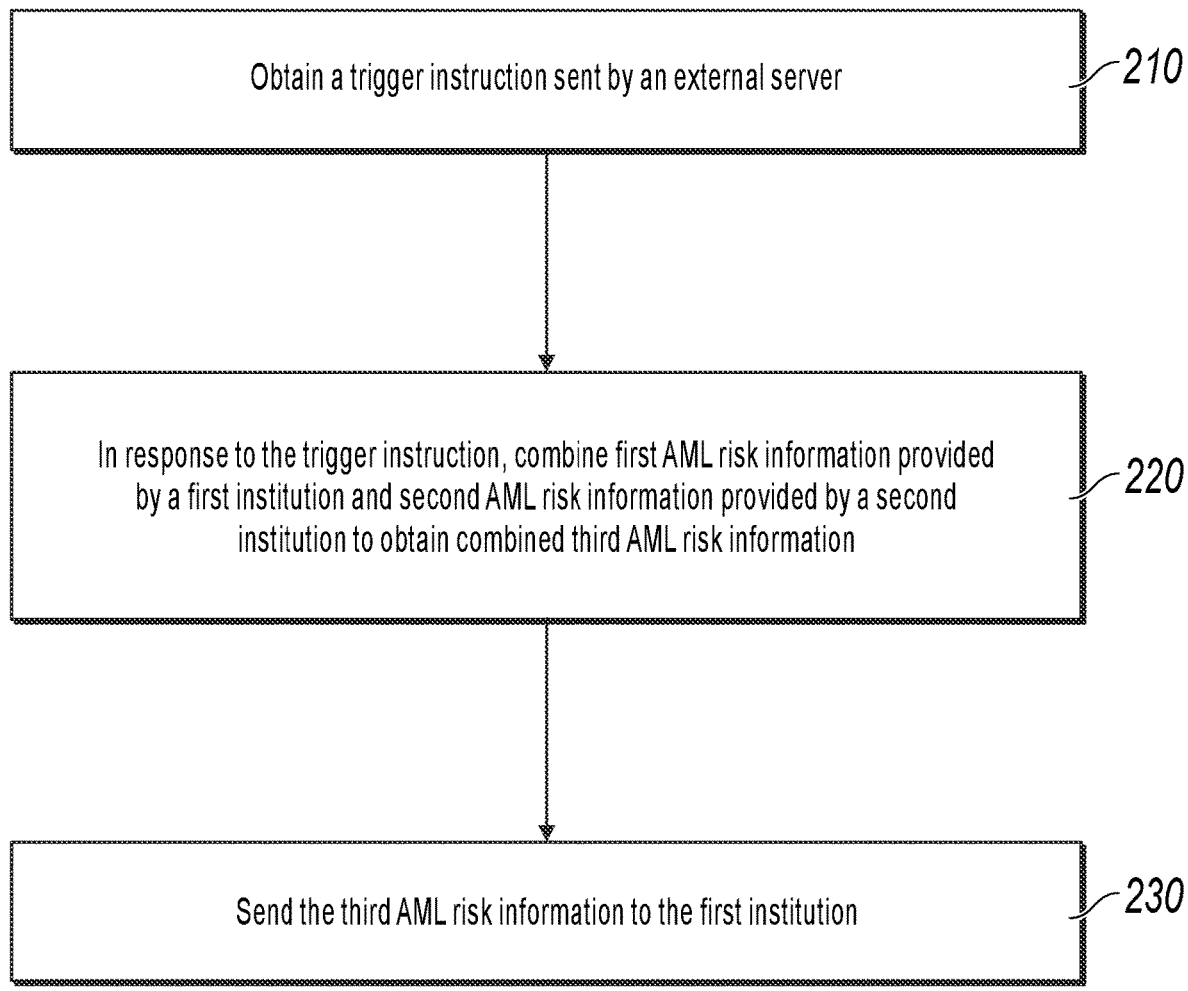
FIG. 2 is a flowchart illustrating an information sharing method, according to some embodiments of the present specification.

FIG. 2 is a flowchart illustrating an information sharing method, according to some embodiments of the present specification. From a program perspective, the process can be executed by a program or an application client device that is loaded on an application server. The execution body in the embodiments of the present specification can be an application service cluster responsible for privacy computing. The server cluster can include one or more application services. These application services can have data interaction with a blockchain network, or can be deployed on a blockchain. In the following embodiment, for ease of description, the application server cluster responsible for privacy computing can be replaced with a "privacy computing unit".

As shown in FIG. 2, the process can include the following steps:

Step 210: Obtain a trigger instruction sent by an external server.

The trigger instruction can be only one instruction used to trigger the privacy computing unit to perform AML risk information combination; or can be a user identifier of a user corresponding to the combined AML risk information. For example, the trigger instruction can be information that triggers the privacy computing unit to combine AML risk information of user A.

Optionally, the trigger instruction can be sent by the external server based on a timed triggering rule. The external server can be a timed server deployed respectively and used to verify timed triggering information. In actual implementation, the timed triggering rule can be deployed on the external server. When detecting that current event information satisfies the timed triggering rule, the external server sends a trigger instruction to the privacy computing unit.

The timed triggering rule can include predetermined duration and a predetermined starting moment. For example, the timed triggering rule can be that AML risk information combination is triggered every two hours, or can be that AML risk information combination is triggered at 8:00 a.m. everyday. Specifically, a timed function service can be deployed on the external server, and the timed function service can record time. When timed duration of the timed function service reaches predetermined duration or a current moment recorded in the timed function service reaches a predetermined starting moment, the external server can send a trigger instruction to the privacy computing unit to trigger the privacy computing unit to perform AML risk information combination.

In an actual application, a case that a large amount of data to be verified has been stored in a cloud storage server although the timed triggering rule is not satisfied may exist. The data to be verified here can refer to data on which AML risk information verification is to be performed. A large amount of data to be verified stored in the cloud storage server can cause load demand of the server to be excessively overloaded. However, because the timed triggering rule is not satisfied, data to be verified uploaded by a user cannot be sent to the privacy computing unit. To solve this technical problem, the external server can further monitor the data amount of the data to be verified in the cloud storage server. Even if the timed triggering rule is not satisfied, as long as the data amount in the cloud storage server reaches a predetermined data amount threshold, the privacy computing unit can be triggered to perform AML risk information combination, so as to reduce the load demand of the cloud storage server.

Step 220: In response to the trigger instruction, combine first AML risk information provided by a first institution and second AML risk information provided by a second institution to obtain combined third AML risk information, where the combined first AML risk information and second AML risk information correspond to the same user identifier.

It is worthwhile to note that the first institution can be a financial institution, and a user can initiate a transaction through the financial institution, such as money transfer, remittance, or purchasing a financial product issued by the first institution. The first user can be an individual user, an enterprise user, etc. The first institution can perform anti-money laundering review on the first user. For example, the first institution can obtain an STR crime label or a money-laundering risk level label of the first user based on information such as basic data of the first user and a historical transactions. For an individual user, the basic data can include a part or all of information such as name, gender, nationality, certificate type, certificate number, age, occupation, mobile phone number, contact address, etc. of the individual. For an enterprise user, the basic data can include a part or all of information such as name, business license number, business place address, name of legal representative, certificate type, certificate number, validity period, etc. of the enterprise.

The user identifier can indicate information used to specifically identify a user identity. For example, the user identifier can be a user ID, can be a user name, etc. The user ID can be an account registered by the user at the first institution, or an account allocated to the user by a system of the first institution when the first user initiates an operation (such as initiating money transfer or purchasing a financial product) at the first institution. Such an account can be, for example, a character string. The user ID should specifically identify a user. The corresponding field is information of the individual user or the enterprise user as described above.

For an individual user, if an identity card is uniformly used as the certificate type, the first user ID can also be an identity card number. However, the identity card number is actually also personal privacy data. Therefore, considering that personal privacy data should not be disclosed, hash processing can be performed on the identity card number. Because hash calculation has a unidirectional feature and a feature of hiding original information, and a good hash function has an anti-collision capability, that is, there is a very high probability that hash values obtained by different inputs are also different, a hash calculation result (or referred to as a digest value) can be used as a user ID. This is also the case for the mobile phone number.

Similarly, hash calculation can be performed after a group of data of a user is concatenated in order, and a digest value obtained is used as the first user ID, for example, a digest value obtained by hash(name+certificate type+certificate number) is used as a user ID, where "+" can represent sequential concatenation of characters beforehand and afterward. Anti-money laundering generally has a relatively high requirement for data security. To further strengthen data security protection, a salting operation can also be performed in hash calculation, for example, hash(name+certificate type+certificate number+salt), where salt is a value generated based on a predetermined rule.

The first institution can prompt the user to provide the basic data when the first user registers, or can request the first user to provide the basic data when the first user initiates an operation at the first institution platform.

As described above, AML risk information of the first user is, for example, an STR crime label [drug crime] [organized crime of a gangdom] labeled by the first institution to the first user, or a money-laundering risk level label [high risk level] labeled by the first institution to the first user. The first user ID corresponds to the AML risk information of the first user.

Each institution can store AML risk information of a user in the cloud storage server. After receiving the trigger instruction, the privacy computing unit can obtain the AML information of the user from the cloud storage server to perform matching and combination. To ensure security of user information, AML risk information uploaded by each institution to the cloud storage server can be encrypted, and AML risk information obtained by the privacy computing unit from the cloud storage server can also be encrypted, so as to ensure security in a data transmission process. Similarly, the user identifier can be also encrypted, especially in a case that an identity card number or a mobile phone number is used as the user ID. In addition, the first institution can sign content sent to the privacy computing unit by using a private key of the first institution. After verifying a signature by using a public key of the first institution, a recipient can acknowledge that the information is sent by the first institution, and the content is complete and is not tampered with.

When the first AML risk information provided by the first institution and the second AML risk information provided by the second institution are combined, specifically, risk labels in the risk information can be combined. Specifically, the first AML risk information can include a first risk label, and the second AML risk information can include a second risk label.

The combining the first AML risk information and the second AML risk information that have the same user identifier can specifically include:

combining the first risk label and the second risk label to obtain a combined third risk label.

For example, the first risk label in the first AML risk information is {drug crime, organized crime of a gangdom}, and the second risk label in the second AML risk information is {smuggling crime}. The combination result can be {drug crime, organized crime of a gangdom, smuggling crime}.

Step 230: Send the third AML risk information to the first institution.

The privacy computing unit can send the combined third AML risk information to the first institution, or can send the combined third AML risk information to the second institution, or send the combined third AML risk information to the first institution and the second institution at the same time. That is, the combined third AML risk information is fed back to the institution providing the AML risk information.

The third AML risk information can also be encrypted by using a public key of a recipient, so the original information can be obtained through decryption using a corresponding private key only by the recipient who has the corresponding private key. Before sending the combined third AML risk information to the first institution and the second institution, the privacy computing unit can further first verify an identity of the first institution and an identity of the second institution. In addition, the privacy computing unit can further send the combined third AML risk information to the first institution and the second institution respectively based on the matched and consistent DID of the first institution and the DID of the second institution, and the sent information can also be signed by using a private key of the privacy computing unit.

In addition, the privacy computing unit can further send a proof of the combination result to the blockchain. The proof of the combination result can include a verifiable claim (VC) signed by the privacy computing unit. The VC is also an important application in the DID. The VC can be stored on the blockchain platform. For example, content of the VC can include a hash value of a combination result corresponding to a user ID, and the hash value is signed by the privacy computing unit. The privacy computing unit can further store its DIDdoc on the blockchain.

When verifying AML risk information of an institution to the user, a regulatory organization can verify the corresponding VC through the blockchain in addition to obtaining the combination result from the institution. Specifically, when obtaining the public key in the DIDdoc of the privacy computing unit from the blockchain, and verifying the combination result of the institution, the regulatory organization can further verify the signature of the VC by using the public key of the privacy computing unit, so as to acknowledge that the VC is issued by the privacy computing unit and is complete, that is, the VC is not tampered with, and the hash value is corresponding to the combination result. As such, authenticity acknowledgement of the combination result can be improved based on a non-tampering feature of the blockchain platform and trustworthiness of the signature institution. The trustworthiness of the signature institution, that is, the trustworthiness of the privacy computing unit/ smart contract, can be implemented by auditing the identity of the privacy computing unit and the contract code deployed therein. The identity of the privacy computing unit is audited, for example, the previously-mentioned challenge initiation process can verify that the identity of the privacy computing unit is trustworthy.

It should be understood that, in the method described in one or more embodiments of the present specification, sequences of some steps in the method can be exchanged with each other based on an actual requirement, or some steps in the method can be omitted or deleted.

In the method of FIG. 2, the trigger instruction sent by the external server is obtained; in response to the trigger instruction, the first AML risk information provided by the first institution and the second AML risk information provided by the second institution are combined to obtain the combined third AML risk information, where the combined first AML risk information and second AML risk information correspond to the same user identifier; and the third AML risk information is sent to the first institution. A matching and combination process of AML risk information can be triggered by using the external server, so as to satisfy a need of proactively triggering AML risk information verification of a user.

Based on the method in FIG. 2, embodiments of the present specification further provide some specific implementations of the method, which are described below.

Optionally, the combining first AML risk information provided by a first institution and second AML risk information provided by a second institution can specifically include:

obtaining a first user identifier corresponding to the first AML risk information;

obtaining a second user identifier corresponding to the second AML risk information;

and combining the first AML risk information and the second AML risk information that have the same user identifier, to obtain and store the combined third AML risk information.

It is worthwhile to note that in practice, each institution can upload the AML information of the user to the cloud storage server for storage. The storage server can be an object storage server (OSS), or can be another cloud storage server. This is not specifically limited in the embodiments of the present specification. After receiving the trigger instruction sent by the external server, the privacy computing unit can combine AML risk information that has the same user identifier. The privacy computing unit can proactively send a combination result to each institution that provides the AML information. Or the combination result can be stored, and after a sharing request of each institution is received, corresponding AML information is sent to the requesting institution. When the combination result is stored, the combination result can be stored in a blockchain, or can be stored in a specified server, and the blockchain or the specified server storing the combination result can exchange data with the privacy computing unit. When the combination result is stored, the DID or the user identifier of each institution that provides the AML risk information in the combination result can be further stored. After the combination result is stored, the combination result is sent to the corresponding institution after the sharing request is received, which can be implemented by using the following steps:

Optionally, after the obtaining and storing the combined third AML risk information, the method can further include:

receiving a first sharing request sent by the first institution, where the first sharing request includes a user identifier of a first user;

receiving a second sharing request sent by the second institution, where the second sharing request includes a user identifier of a second user; and matching the user identifier of the first user against the user identifier of the second user, and if they are consistent, sending the combined third AML risk information corresponding to the user identifier to the first institution and the second institution.

Optionally, the sharing request can be sent to the privacy computing unit by initiating a transaction for invoking a smart contract.

Optionally, the sharing request can further be sent to a privacy computing unit on a blockchain or off a blockchain by initiating a transaction for invoking a smart contract. The sharing request can include a signature of a sender. The sender can be the first institution, the second institution, or another institution.

It is worthwhile to note that, in a case that the user ID is an account registered by the user at the institution, accounts registered by the same user at different institutions are the same. In a case that the user ID is an account allocated to the user by the system of the institution when the user initiates an operation at the institution, the account allocated to the same user by the system of the first institution and the account allocated to the same user by the system of the second institution are the same. As such, the first AML risk information provided by the first institution can be combined with the second AML risk information provided by the second institution.

In a case that the user ID includes a digest value obtained through hash calculation on one or more pieces of information of the user, the ID of the user in the first institution and the ID of the user in the second institution should use the same hash function and input, thereby ensuring that the ID of the same user in the first institution and the ID of the same user in the second institution are the same.

For a salting operation, the first institution and the second institution can use the same salt through negotiation in advance.

That the first institution sends the first sharing request to the privacy computing unit can be specifically that the first institution sends the first sharing request to the privacy computing unit by initiating a transaction for invoking a contract.

Optionally, the method in the previously-mentioned embodiments can further include:

receiving a third sharing request sent by a third institution, where the third sharing request includes an identifier of the third institution;

determining whether the identifier of the third institution corresponds to the third AML risk information; and sending the third AML risk information to the third institution if the identifier of the third institution corresponds to the third AML risk information.

In an embodiment, the sharing request sent by the third institution can include only the user identifier of the user. The privacy computing unit can search for a combination result corresponding to the DID based on the DID of the third institution, or can search for a combination result corresponding to the user identifier based on the user identifier of the third institution. If the combination result exists, the privacy computing unit can send the combination result (third AML risk information) to the third institution. For example, the sharing request includes {DID of the third institution, third user ID}. In this case, a combination result that includes the DID of the third institution and the third user ID can be {drug crime, organized crime of a gangdom}. In this case, the combination result can be pushed to the third institution.

In another embodiment, the sharing request sent by the third institution can further include AML risk information, and a combination result that includes the AML risk information can be sent to the third institution based on the AML risk information sent by the third institution. For example, the sharing request sent by the third institution is {DID of the first institution, first user ID, AML risk information [drug crime] [organized crime of a gangdom]}. In this case, a combination result that includes the AML risk information is {drug crime, organized crime of a gangdom, smuggling crime}. In this case, the combination result can be pushed to the third institution.

It is worthwhile to note that the combination result can include only a risk label. In some cases, the combination result can further include an institution DID, a user ID, and a risk label.

As described above, the first sharing request can further include a DID of the first institution. Similarly, the second sharing request can further include a DID of the second institution. Further, the privacy computing unit can match user IDs in sharing requests from different institutions, and if they are consistent, combine AML risk information for the ID. For example, the first sharing request includes {DID of the first institution: first user ID: STR crime label of the first user [drug crime] [organized crime of a gangdom]}, and the second sharing request includes {DID of the second institution: second user ID: STR crime label of the second user [smuggling crime] }. In the previously-mentioned example, if the first user ID in the first sharing request matches the second user ID in the second sharing request, for example, is fully consistent, the privacy computing unit can combine the first AML risk information and the second AML risk information. A combination result is, for example, {DID of the first institution; DID of the second institution: first user ID/second user ID: STR crime labels of the first user/second user [drug crime] [organized crime of a gangdom] [smuggling crime]}.

Optionally, after the determining whether both the first sharing request and the second sharing request include AML risk information, the method can further include:

if both the first sharing request and the second sharing request include AML risk information, determining whether the AML risk information satisfies a predefined rule;

performing matching if the AML risk information satisfies the predefined rule; and performing no matching if the AML risk information does not satisfy the predefined rule.

The predefined rule includes: whether data corresponding to the risk information includes a predefined risk label.

When an institution is set to send a sharing request that needs to include AML risk information, after the sharing request sent by the institution is received, whether the sharing request includes the AML risk information can be first determined. If the sharing request does not include the AML risk information, a combination result is not to be sent to the institution. If the AML risk result is included, whether the AML risk information included in the sharing request satisfies the predefined rule can be further determined. If the AML risk information included in the sharing request does not satisfy the predefined rule, the combination result is not to be sent to the institution to solve sharing existing AML risk information with an institution that does not provide any AML risk information or provides incorrect AML risk information.

The predefined rule can include: whether data corresponding to the risk information includes a predefined risk label. For example, the predefined risk label is an STR crime label {drug crime, organized crime of a gangdom, smuggling crime}. In this case, it can be determined whether the risk information includes these labels, and specifically, only at least one type of label in these crime labels needs to be included.

As described above, the privacy computing unit can be deployed with a smart contract, and the trigger instruction sent by the external server can be used to invoke the smart contract in the privacy computing unit, so as to perform the step of combining the first AML risk information provided by the first institution and the second AML risk information provided by the second institution.

The blockchain technology supports the user to create and invoke some complex logic in the blockchain network since Ethereum, which is one of the biggest advances of Ethereum compared with the bitcoin technology. An Ethereum virtual machine (EVM) is the core of Ethereum, which is a programmable blockchain, and each Ethereum node can run the EVM. The EVM is a Turing-complete virtual machine, through which various complex logics can be implemented. A user can deploy and invoke a smart contract by using the EVM in Ethereum. In the deployment phase, the user can send a transaction for creating a smart contract to Ethereum. The data field of the transaction can include a code (such as a bytecode) of the smart contract. The to field of the transaction is null. After diffusion and consensus of the transaction, each node in the Ethereum network can execute the transaction by using the EVM, and generate a corresponding contract instance, so as to complete deployment of the smart contract. In this case, the blockchain can have a contract account corresponding to the smart contract, and the contract account has a specific contract address. In the invoking phase, a user (which can be the same or different from the user deploying the smart contract) sends a transaction used to invoke a smart contract to the Ethereum network, where the from field of the transaction is an address of an external account corresponding to the user, the to field is a contract address of the smart contract that needs to be invoked, and the data field includes a method and a parameter for invoking the smart contract. After consensus is reached between the nodes by using the consensus mechanism, the smart contract invoked as declared by the above transaction is independently executed on each node of the Ethereum network in a specified method, and all execution records and data are stored in the blockchain. Therefore, after the transaction is completed, transaction records that cannot be tampered with and will not be lost are stored in the blockchain. With development of blockchain technologies, in addition to the EVM, many other types of virtual machines, such as WebAssembly (WASM) virtual machines, are generated.

Each blockchain node can create and invoke a smart contract by using a virtual machine. It is a challenge for privacy protection to store transactions that include smart contracts and execution results of transactions in a blockchain ledger, or to store all ledgers on each full node in the blockchain. Privacy protection can be implemented by using a plurality of technologies, such as cryptography technologies (such as homomorphic encryption or zero-knowledge proof), hardware privacy technologies, and network isolation technologies. The hardware privacy protection technologies typically includes a trusted execution environment (TEE).

For example, the blockchain nodes can implement a secure execution environment for blockchain transactions by using the TEE. The TEE is a trusted execution environment that is based on a secure extension of CPU hardware and fully isolated from the outside. Currently, the industry attaches great importance to the TEE solution. Almost all mainstream chips and software alliances have their own TEE solutions, such as a trusted platform module (TPM) in a software aspect and Intel Software Guard Extensions (SGX), ARM Trustzone, and AMD Platform Security Processor (PSP) in a hardware aspect. The TEE can function as a hardware black box. Codes and data executed in the TEE cannot be peeped even at an operating system level, and can be operated only by using an interface predefined in the codes. In terms of efficiency, because of the black box nature of the TEE, an operation in the TEE is performed on plaintext data instead of a complex cryptographic operation in homomorphic encryption, and efficiency of a calculation process is hardly lost. Therefore, by deploying the TEE environment on the blockchain node, privacy needs in the blockchain scenario can be satisfied to a great extent while a performance loss is relatively small.

Intel SGX (SGX for short) technology is used as an example. The blockchain node can create an enclave based on the SGX technology as a TEE for executing a blockchain transaction. The blockchain node can allocate a part of enclave page cache in a memory by using a processor instruction newly added to a CPU, so as to retain the previously-mentioned enclave. A memory area corresponding to the previously-mentioned EPC is encrypted by a memory encryption engine (MEE) in the CPU, content (codes and data in the enclave) in the memory area can be decrypted only in the CPU core, and keys used for encryption and decryption are generated and stored in the CPU only when the EPC starts. It can be understood that a security boundary of the enclave includes only itself and the CPU, neither privileged nor unprivileged software can access the enclave, and even an operating system administrator and a virtual machine monitor (VMM, or referred to as a hypervisor) can affect the codes and data in the enclave. Therefore, the enclave has very high security. In addition, with the previously-mentioned security guarantee, the CPU can process a blockchain transaction in a plaintext form in the enclave, and has very high operation efficiency, so both data security and calculation efficiency are ensured. Data that enters or exits the TEE can be encrypted, so as to ensure data privacy.

In the embodiments of the present specification, the privacy computing unit can be deployed on a node on a blockchain system, or can be deployed on a device outside the blockchain system. If the privacy computing unit is a blockchain node, the privacy computing unit in the blockchain node can be, for example, a TEE created by the blockchain node based on the SGX technology, so as to be used for executing the blockchain transaction in a trusted and secret way. A virtual machine can be run in the TEE, so a contract is executed by using the virtual machine. As such, for an encrypted transaction for invoking a contract that is sent to the privacy computing unit of the blockchain node, the privacy computing unit can decrypt and execute the encrypted transaction in the virtual machine loaded in the privacy computing unit, and can encrypt and output an execution result. The technology for remote attestation in SGX can prove that it is legitimate SGX, and programs executed therein (e.g., virtual machine codes) are consistent with expectations. The invoked contract, as described above, can be deployed on the blockchain in advance. The deployed contract, through codes therein, can initiate an access request to data outside the blockchain during execution, or can send an execution result to another physical or logical entity outside the blockchain after execution ends. Specifically, as described below, the execution result of the smart contract can be transmitted by the TEE in the blockchain node to the first institution and the second institution by using an oracle mechanism.

Each blockchain node creates and invokes a smart contract by using a virtual machine which can consume relatively more resources. Compare to using the TEE technology to protect privacy on each node in the blockchain network, a privacy computing node (that is, an off-chain privacy computing node, also referred to as a "privacy computing unit" in the embodiments of the present disclosure) can be deployed outside the blockchain network (or referred to as "off-chain"), so computing operations that originally need to be performed on all the blockchain nodes are transferred to the off-chain privacy computing node for execution. Based on a verifiable computation technology, it can be proven that the previously-mentioned computing results are actually performed as expected in the TEE, thereby ensuring reliability while reducing on-chain resource consumption.

An off-chain TEE created on the off-chain privacy computing node is similar to the on-chain TEE created on the blockchain node, and can be a TEE implemented based on CPU hardware and fully isolated from the outside. After creating the off-chain TEE, the off-chain privacy computing node can implement a deployment operation on an off-chain contract and an operation of invoking the contract after the deployment by using the off-chain TEE, and ensure data security in the operation process.

Before being used, the privacy computing node can prove to a user that the privacy computing node is trustworthy. The process of proving itself trustworthy may involve a remote attestation report. The processes that the on-chain and off-chain privacy computing nodes prove themselves trustworthy are similar. Using the off-chain privacy computing node as an example, a remote attestation report is generated in a remote attestation process for the off-chain TEE on the off-chain privacy computing node. The remote attestation report can be generated after an authoritative authentication server verifies self-recommendation information generated by the off-chain privacy computing node. The self-recommendation information is related to the off-chain TEE created on the off-chain privacy computing node. The off-chain privacy computing node generates the self-recommendation information related to the off-chain TEE, and after the authoritative authentication server verifies the self-recommendation information, the remote attestation report is generated, so the remote attestation report can be used to indicate that the off-chain TEE on the off-chain privacy computing node is trustworthy.

For example, before the privacy computing unit obtains the first AML risk information provided by the first institution, the first institution can first verify whether the off-chain privacy computing unit is trustworthy. Specifically, the first institution can challenge the off-chain privacy computing node, and receive the remote attestation report returned by the off-chain privacy computing node. For example, the first institution can initiate an off-chain challenge to the off-chain privacy computing node, that is, the process of initiating the challenge can be independent of the blockchain network, so a consensus process between the blockchain nodes can be skipped and on-chain and off-chain interoperability can be reduced. Therefore, the challenge of the first institution to the off-chain privacy computing node has higher operational efficiency. For another example, the financial institution can use an on-chain challenge, for example, the financial institution can submit a challenge transaction to the blockchain node. Challenge information contained in the challenge transaction can be transmitted by the blockchain node to the off-chain privacy computing node by using the oracle mechanism, and the challenge information is used to challenge the off-chain privacy computing node. Regardless of the previously-mentioned on-chain challenge or the off-chain challenge, after obtaining the remote attestation report, a challenger (such as the financial institution) can verify a signature of the remote attestation report based on a public key of the authoritative authentication server, and if the verification succeeds, can acknowledge that the off-chain privacy computing node is trustworthy.

The off-chain privacy computing platform can store a pair of public and private keys in the TEE. The public key can be sent to a counterpart in a process such as a remote attestation process, and the private key is properly stored in the TEE. When it is determined, based on the remote attestation report, that the off-chain privacy computing node is trustworthy, the financial institution can encrypt and transmit a bytecode of the off-chain contract to the off-chain privacy computing node, and the off-chain privacy computing node obtains the bytecode through decryption in the off-chain trusted execution environment and deploys the bytecode. The previously-mentioned encryption can use the public key. In the previously-mentioned process, after a contract is deployed on the off-chain privacy computing node, the contract can be stored, and a hash value of the contract is calculated. The hash value of the contract can be fed back to the deployer of the contract. The deployer can locally generate a hash value for the deployed contract. Therefore, the deployer can compare whether a hash value of the deployed contract is the same as the local contract hash value. If they are the same, it indicates that the contract deployed on the off-chain privacy computing node is a contract deployed by the deployer. Content sent from the off-chain privacy computing node can be signed by using a private key stored in the TEE, so as to prove that the content is a result of execution by the TEE. Actually, a plurality of smart contracts can be deployed in the TEE, and the TEE can generate a separate pair of public and private keys for each smart contract. Therefore, each deployed smart contract can have an ID (for example, a public key corresponding to the smart contract or a character string generated based on the public key), and a result of execution of each smart contract can also be signed by using a private key that is properly stored in the TEE and corresponding to the smart contract. As such, it can be proved that a result is a result of execution of a specific contract in the off-chain privacy computing node. As such, execution results of different contracts can be signed by different private keys. Only a corresponding public key can verify the signature, or if a corresponding public key cannot verify the signature, it cannot be proved that the result is an execution result of a corresponding contract. Therefore, it is equivalent to that an identity is assigned to the contract deployed in the off-chain privacy computing node by using a pair of public and private keys. The previous description uses the off-chain privacy contract as an example. The on-chain privacy contract is also similar, and can also have an identity, that is, have a pair of public and private keys.

Subsequently, the off-chain privacy computing node can invoke the deployed off-chain contract. Specifically, when the deployed off-chain contract is invoked, a bytecode of the deployed contract can be loaded and executed in the off-chain trusted execution environment, and an execution result can be fed back to an invoker of the contract, or fed back to a recipient specified in the contract or a recipient specified in a transaction for invoking the contract, or fed back to the blockchain node by using the oracle mechanism. The execution result fed back to the blockchain node by using the oracle mechanism can be further fed back to the recipient specified in the on-chain contract or to the recipient specified in the transaction for invoking the on-chain contract via the setting of the on-chain contract.

In addition, the execution result of the off-chain privacy computing node can be output after being encrypted by using a key. For example, in an asymmetric encryption method, a public key used for encryption can be a public key in a pair of public and private keys negotiated in the previously-mentioned challenge process, or can be sent by a challenger to the off-chain privacy computing node after being generated by using the DIS service. The challenger here can be the first institution in the embodiments of the present specification. Therefore, in the previously-mentioned method, it can be ensured that all data entering or exiting the off-chain privacy computing node is encrypted, so as to ensure security in a data transmission process. Similarly, data entering the off-chain privacy computing node can be signed by a sender by using a key of the sender, so as to prove, by using a signature verification process, that the data is sent by the sender, and content is complete and is not tampered with. The principles in the subsequent similar steps are the same.

Similarly, an identity can be created for the previously-mentioned challenger or the first institution by combining the DIS with the blockchain. A blockchain can provide a decentralized (or weakly centralized), non-tampering (or difficult to tamper with), trusted distributed ledger, and can provide a secure, stable, transparent, auditable, and efficient method of recording transactions and data information interaction. A blockchain network can include a plurality of nodes. Generally, one or more nodes of the blockchain belong to one participant. Generally, the more participants in a blockchain network, the more authoritative the participants are, the more trustworthy the blockchain network is. Here, a blockchain network formed by a plurality of participants is referred to as a blockchain platform. The blockchain platform can help the first institution to verify the identity.

In order to use the distributed digital identity service provided by the blockchain platform, the first institution can register its identity in the blockchain platform. For example, the first institution can create a pair of public and private keys, secretly store the private key, and can create a distributed digital identity (also referred to as a decentralized identifier, DID). The first institution can create the DID by itself, or can request a decentralized identity service (DIS) system to create the DID. The DIS is a blockchain-based identity management solution that provides functions such as creating, verifying, and managing digital identities, so as to manage and protect entity data under regulation, ensure authenticity and efficiency of information flow, and solve problems such as cross-institution identity authentication and data cooperation. The DIS system can be connected to the blockchain platform. A DID can be created for the first institution by using the DIS system, the DID and the public key are sent to the blockchain platform for storage, and the created DID is further returned to the first institution. The public key can be included in DIDdoc, which can be stored in the blockchain platform. The DIS can create the DID for the first institution based on the public key sent by the first institution, for example, the DID is created after the public key of the first institution is calculated by using the hash function; or DID can be created based on other information of the first institution (which can include the public key or not include the public key). The latter case may need the first institution to provide information other than the public key. Afterward, the first institution can provide a verification function to prove to other parties that it is the first institution. For a specific example, references can be made to FIG. 3.

Figure 3:
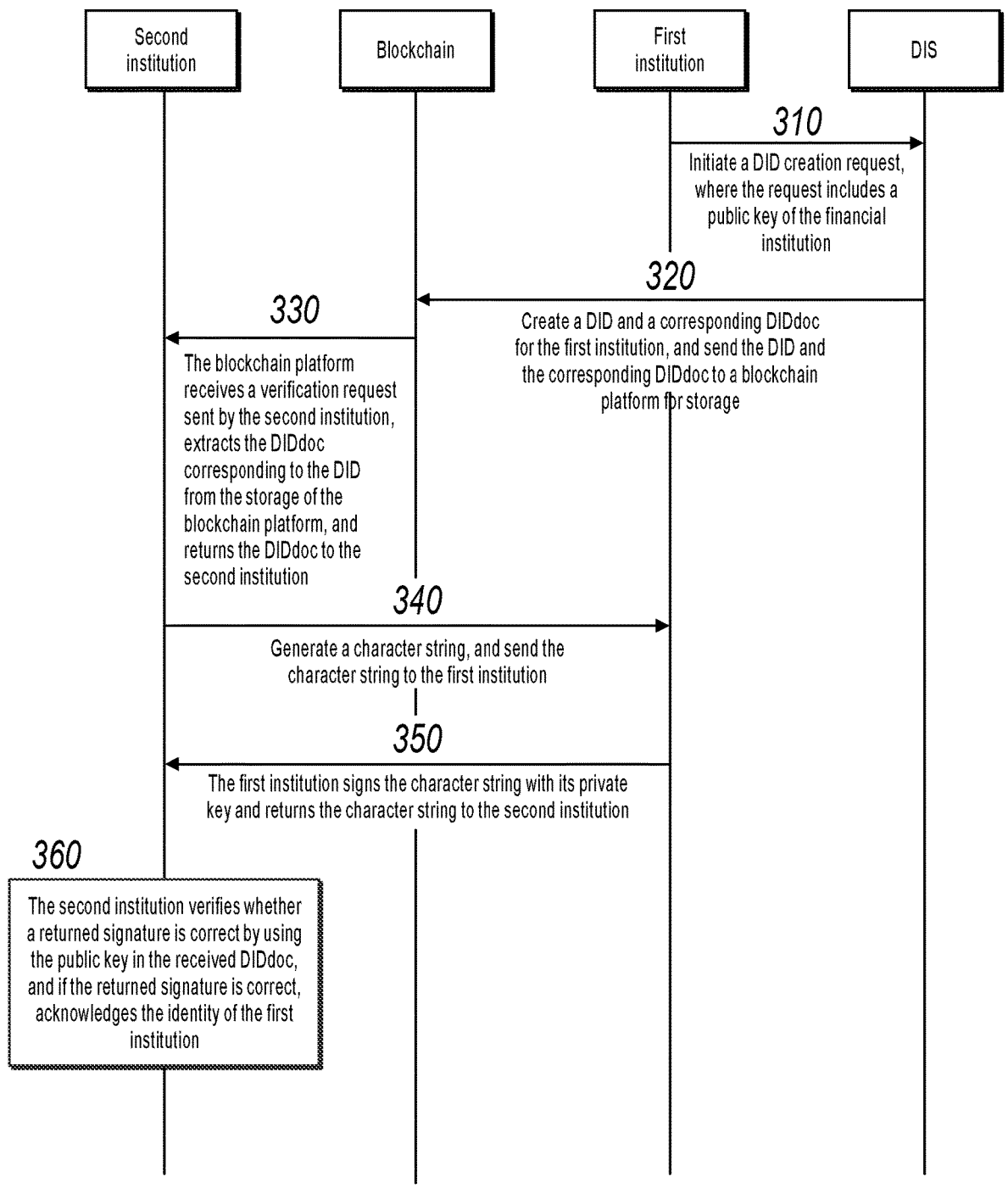
FIG. 3 is a flowchart of providing a verification function by using a decentralized identity service (DIS) and a blockchain, according to some embodiments of the present specification.

FIG. 3 is a flowchart of providing a verification function by using a DIS and a blockchain, according to some embodiments of the present specification. As shown in FIG. 3, the process includes:

Step 310: A first institution initiates a DID creation request to a DIS, where the request includes a public key of the first institution.

Step 320: In response to the creation request, the DIS creates a DID and a corresponding DIDdoc for the first institution, and sends the DID and the corresponding DIDdoc to a blockchain platform for storage, where the DIDdoc includes the public key of the first institution.

Step 330: The blockchain platform receives a verification request sent by a second institution, where the verification request includes the DID of the first institution; and the blockchain platform extracts the DIDdoc corresponding to the DID from the storage of the blockchain platform, and returns the DIDdoc to the second institution.

Step 340: The second institution generates a character string and sends the character string to the first institution.

Step 350: The first institution signs the character string with its private key and returns the character string to the second institution.

Step 360: The second institution verifies whether a returned signature is correct by using the public key in the previously received DIDdoc, and if the returned signature is correct, acknowledges the identity of the first institution.

A smart contract deployed on the privacy computing unit can receive the first sharing request sent by the first institution, and in addition to the first user ID and the corresponding first AML risk information, the first sharing request can further include the DID of the first institution.

The first sharing request sent by the first institution can be signed by the first institution by using a private key of the first institution. Correspondingly, after receiving the sharing request, the privacy computing unit can verify the signature by using the public key of the first institution.

In addition, an identity of the first institution or the second institution can be verified before the combined first AML risk information and second AML risk information is sent to the first institution and the second institution. The privacy computing unit can further prove an identity of the privacy computing unit to the first institution and the second institution. For a specific method, for example, a process of the previously-mentioned step 310 to step 360 can be used, and details are omitted here for simplicity.

By using the previously-mentioned method, an anti-money laundering obligatory institution can have more AML risk results, thereby improving a more accurate anti-money laundering audit capability of the anti-money laundering obligatory institution, and improving an overall anti-money laundering audit capability of the industry. In addition, a matching and combination process of AML risk information can be triggered by using the external server, so as to satisfy a need of proactively triggering AML risk information verification of a user.

Embodiment 2

Figure 4:
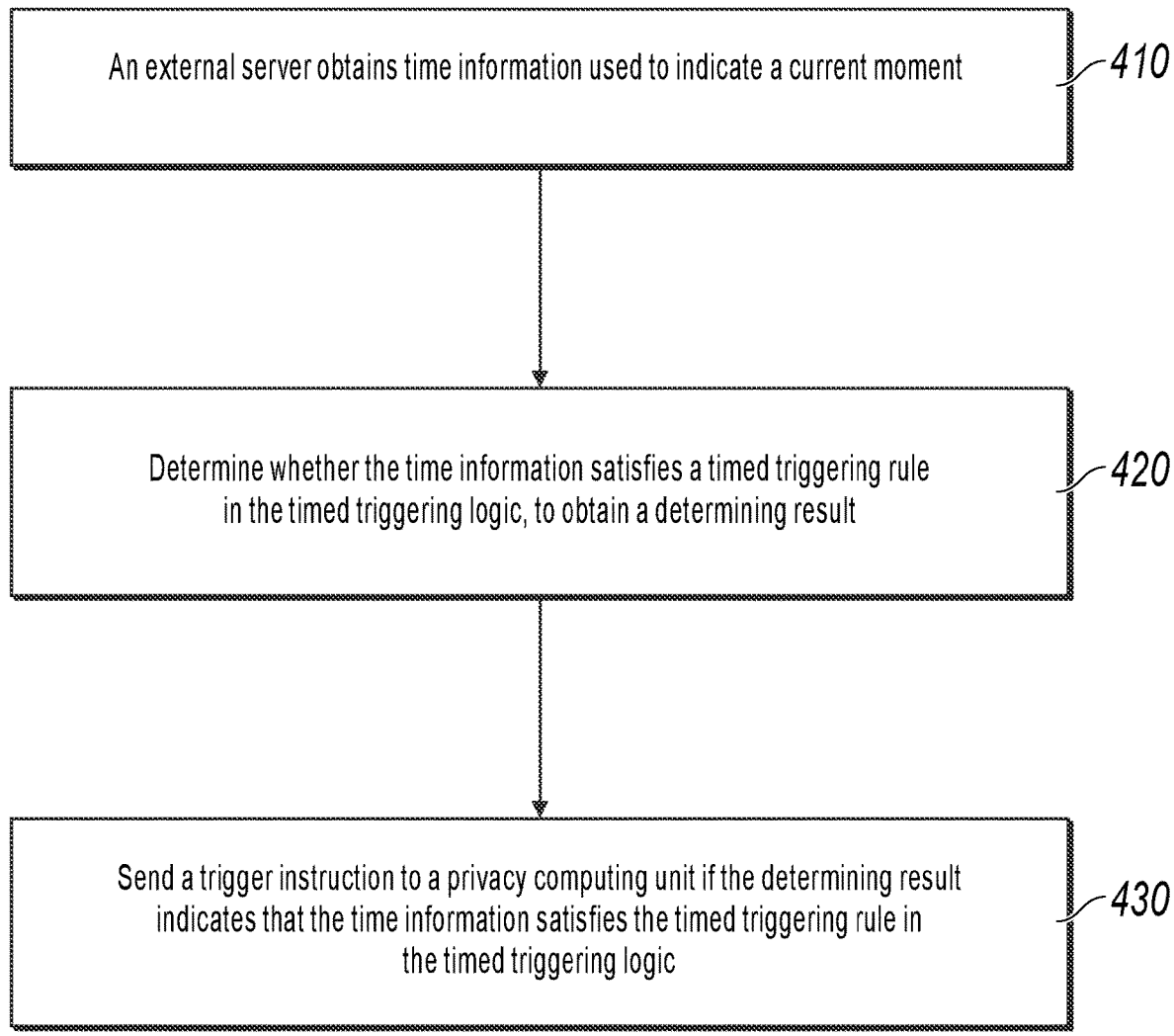
FIG. 4 is a flowchart illustrating an information sharing triggering method, according to some embodiments of the present specification.

FIG. 4 is a flowchart illustrating an information sharing triggering method, according to some embodiments of the present specification. From a program perspective, the process can be executed by a program or an application client device that is loaded on an application server. The execution body in the embodiments can be an external server deployed outside a blockchain and a privacy computing unit, and the external server can be configured to trigger the privacy computing unit at a timed moment to perform AML risk information combination of a user. The external server can also be a server cluster. The server cluster can include one or more servers that can have data interaction with a blockchain network (blockchain system) and the privacy computing unit.

As shown in FIG. 4, the process can include the following steps:

Step 410: An external server obtains time information used to indicate a current moment, where timed triggering logic is deployed on the external server.

The timed triggering logic can be used to: determine a starting moment of a smart contract in the privacy computing unit, and start the smart contract when a current moment reaches the starting moment. This smart contract defines a contract code used to complete AML risk information combination of a user.

The time information can be moment information of the current moment, or can be timed duration information of a timed function in the external server. The external server monitors the time information, sends a trigger instruction at a timed moment to the privacy computing unit, and triggers the privacy computing unit to perform AML risk information combination.

Step 420: Determine whether the time information satisfies a timed triggering rule in the timed triggering logic, to obtain a determining result.

Step 430: Send a trigger instruction to a privacy computing unit if the determining result indicates that the time information satisfies the timed triggering rule in the timed triggering logic, where the trigger instruction is used to trigger the privacy computing unit to combine first AML risk information provided by a first institution and second AML risk information provided by a second institution to obtain combined third AML risk information, where the combined first AML risk information and second AML risk information correspond to the same user identifier; and send the third AML risk information to the first institution.

The method step in the embodiments is corresponding to the method step in Embodiment 1. When detecting that the time information satisfies the timed triggering rule in the timed triggering logic, the external server sends a trigger instruction to the privacy computing unit to trigger the privacy computing unit to perform the method step in Embodiment 1.

In the step of FIG. 4, the external server can be triggered in the following methods to send the trigger instruction to the privacy computing unit:

Method 1: Perform triggering based on timed duration. The method can specifically include the following steps:

Determine whether the timed duration reaches the predetermined duration; and send a trigger instruction to the privacy computing unit if the timed duration reaches the predetermined duration. For example, the predetermined duration is 3 hours, that is, when detecting that the timed duration reaches 3 hours, the external server can send a trigger instruction to the privacy computing unit.

Method 2: Perform triggering based on a moment. The method can specifically include the following steps:

Determine whether the current moment reaches the predetermined starting moment; and send a trigger instruction to the privacy computing unit if the current moment reaches the predetermined starting moment. For example, if the predetermined starting moment is 8:00 and 18:00 everyday, the trigger instruction is sent to the privacy computing unit at 8:00 and 18:00 everyday.

Method 3: Perform triggering based on both time information and a data amount of data to be verified. The method can specifically include the following steps:

If the timed duration does not reach the predetermined duration, or if the current moment does not reach the predetermined starting moment, obtain a data amount of data to be verified stored in the cloud storage server;

determine whether the data amount reaches a predetermined data amount threshold;

and send a trigger instruction to the privacy computing unit if the data amount reaches the predetermined data amount threshold.

It is worthwhile to note that, in the solution in the embodiments of the present specification, the timed trigger instruction is sent by the external server to proactively trigger the privacy computing unit to perform AML risk information combination (actually, the smart contract in the privacy computing unit is triggered to perform AML risk information combination). However, in practice, the privacy computing unit can also be triggered based on the data amount of data to be verified to perform AML risk information combination. Therefore, the trigger instruction sent by the external server to the privacy computing unit can be triggered in the following method:

Method 4: Perform triggering based on a data amount of data to be verified. The method can specifically include the following steps:

The external server obtains data amount information of data to be verified in the cloud storage server, where the data amount information is a specific quantity of the data amount of the data to be verified;

determine whether the data amount of the data to be verified reaches a predetermined data amount threshold; and send a trigger instruction to the privacy computing unit if the data amount of the data to be verified reaches the predetermined data amount threshold.

In the previously-mentioned several methods, the external server can be triggered to send a trigger instruction to the privacy computing unit, and the privacy computing unit can be triggered to perform AML risk information combination. A related institution does not need to trigger AML risk information combination by initiating a transaction. Therefore, a related operation of processing, by the blockchain node, a blockchain transaction for invoking a target smart contract can be reduced, and an operation of initiating a transaction by the related institution can be reduced, thereby improving user experience.

In the method in FIG. 4, the external server proactively sends a trigger instruction to the privacy computing unit, and proactively triggers the smart contract in the privacy computing unit to complete AML risk information combination, so the related institution does not need to invoke the smart contract at a timed moment by initiating a transaction, thereby reducing a related operation of processing, by the privacy computing unit or the blockchain node, a transaction for invoking a smart contract, improving efficiency of completing a scheduled task, reducing an operation of initiating a transaction by the related institution, and helping improve user experience.

Figure 5:
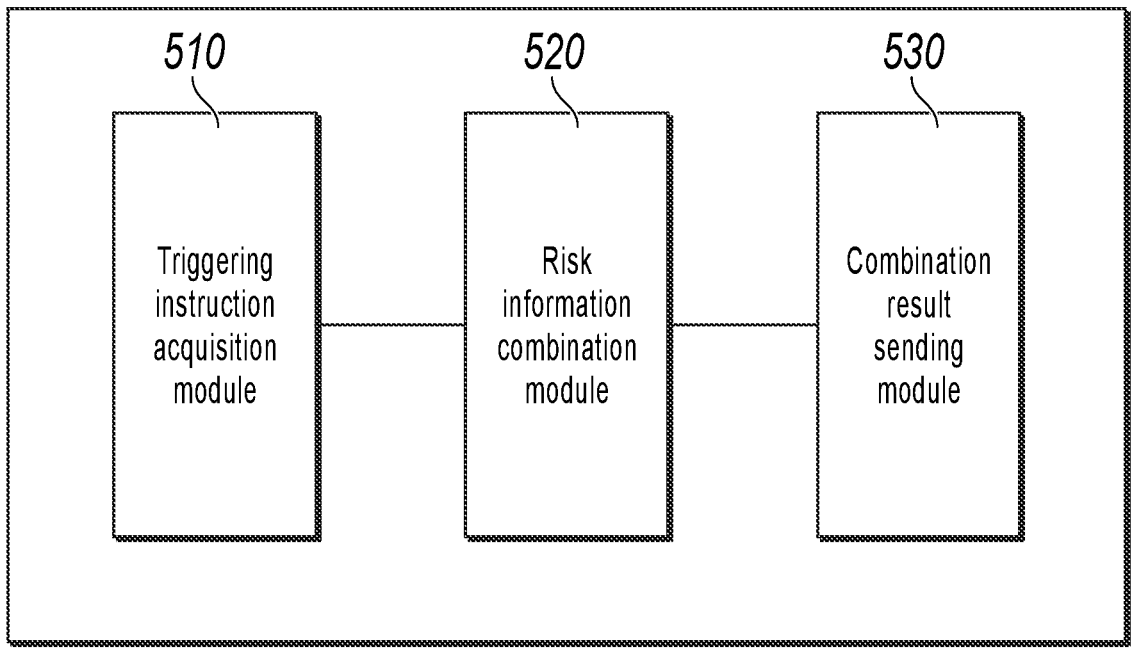
FIG. 5 is a schematic structural diagram illustrating an information sharing apparatus, according to some embodiments of the present specification.

Based on the same idea, some embodiments of the present specification further provide an apparatus that corresponds to the previously-mentioned method Embodiment 1. FIG. 5 is a schematic structural diagram illustrating an information sharing apparatus, according to some embodiments of the present specification. As shown in FIG. 5, the apparatus can include:

a trigger instruction acquisition module 510, configured to obtain a trigger instruction sent by an external server;

a risk information combination module 520, configured to: in response to the trigger instruction, combine first AML risk information provided by a first institution and second AML risk information provided by a second institution to obtain combined third AML risk information, where the combined first AML risk information and second AML risk information correspond to the same user identifier; and a combination result sending module 530, configured to send the third AML risk information to the first institution.

Based on the apparatus in FIG. 5, embodiments of the present specification further provide some specific implementations of the method, which are described below.

Optionally, the apparatus can be further configured to:

send the third AML risk information to the second institution.

Optionally, the trigger instruction can be sent by the external server based on a timed triggering rule.

Optionally, the timed triggering rule can include predetermined duration or a predetermined starting moment.

Optionally, the first AML risk information and the second AML risk information can be stored in a cloud storage server.

Optionally, the provided AML risk information can be encrypted.

Optionally, the risk information combination module 520 can specifically include:

a first user identifier acquisition unit, configured to obtain a first user identifier corresponding to the first AML risk information;

a second user identifier acquisition unit, configured to obtain a second user identifier corresponding to the second AML risk information; and a risk information combination unit, configured to combine the first AML risk information and the second AML risk information that have the same user identifier, to obtain and store the combined third AML risk information.

Optionally, the first AML risk information can include a first risk label, and the second AML risk information can include a second risk label.

The risk information combination unit can specifically include:

a risk label combination subunit, configured to combine the first risk label and the second risk label to obtain a combined third risk label.

Optionally, the apparatus can further include:

a first sharing request receiving module, configured to receive a first sharing request sent by the first institution, where the first sharing request includes a user identifier of a first user;

a second sharing request receiving module, configured to receive a second sharing request sent by the second institution, where the second sharing request includes a user identifier of a second user; and a user identifier matching module, configured to: match the user identifier of the first user against the user identifier of the second user, and if they are consistent, send the combined third AML risk information corresponding to the user identifier to the first institution and the second institution.

Optionally, the sharing request can be sent to the privacy computing unit by initiating a transaction for invoking a smart contract. Or, the sharing request can be sent to a privacy computing unit on a blockchain or off a blockchain by initiating a transaction for invoking a smart contract.

Optionally, the sharing request can include a signature of a sender. The sender can be the first institution or the second institution.

Optionally, the user identifier can include:

an account registered by a user at the institution; or an account allocated to the user by a system of the institution when the user initiates an operation at the institution.

Optionally, the user identifier can include:

a digest value obtained through hash calculation on one or more pieces of information of the user.

Optionally, the user identifier of the user can be encrypted.

Optionally, the privacy computing unit is deployed with a smart contract, and the trigger instruction is used to invoke the smart contract to perform the step of combining the first AML risk information provided by the first institution and the second AML risk information provided by the second institution.

Optionally, the apparatus can further include:

a first verification module, configured to verify an identity of the first institution or the second institution; and a second verification module, configured to prove an identity of the privacy computing unit to the first institution and the second institution.

Optionally, the apparatus can be further configured to:

generate a proof used to prove trustworthiness of the third AML risk information.

Optionally, the proof can be sent to a blockchain system for storage.

Optionally, the proof can include a verifiable claim signed by the privacy computing unit.

Optionally, when verifying the third AML risk information of the first institution, a regulatory organization can further verify a signature of the verifiable claim by using a public key of the privacy computing unit.

Optionally, the first sharing request can further include a DID of the first institution, and the second sharing request can further includes a DID of the second institution.

Optionally, the apparatus can be specifically configured to:

send the third AML risk information to the first institution based on the matched and consistent DID of the first institution.

Optionally, the apparatus can be further configured to:

receive a third sharing request sent by a third institution, where the third sharing request includes an identifier of the third institution;

determine whether the identifier of the third institution corresponds to the third AML risk information; and send the third AML risk information to the third institution if the identifier of the third institution corresponds to the third AML risk information.

Optionally, the apparatus can be further configured to:

determine whether both the first sharing request and the second sharing request include AML risk information; and perform no matching if any sharing request does not include AML risk information.

Optionally, the apparatus can be further configured to:

if both the first sharing request and the second sharing request include AML risk information, determine whether the AML risk information satisfies a predefined rule;

perform matching if the AML risk information satisfies the predefined rule; and perform no matching if the AML risk information does not satisfy the predefined rule.

Optionally, the predefined rule can include: whether data corresponding to the risk information includes a predefined risk label.

Figure 6:
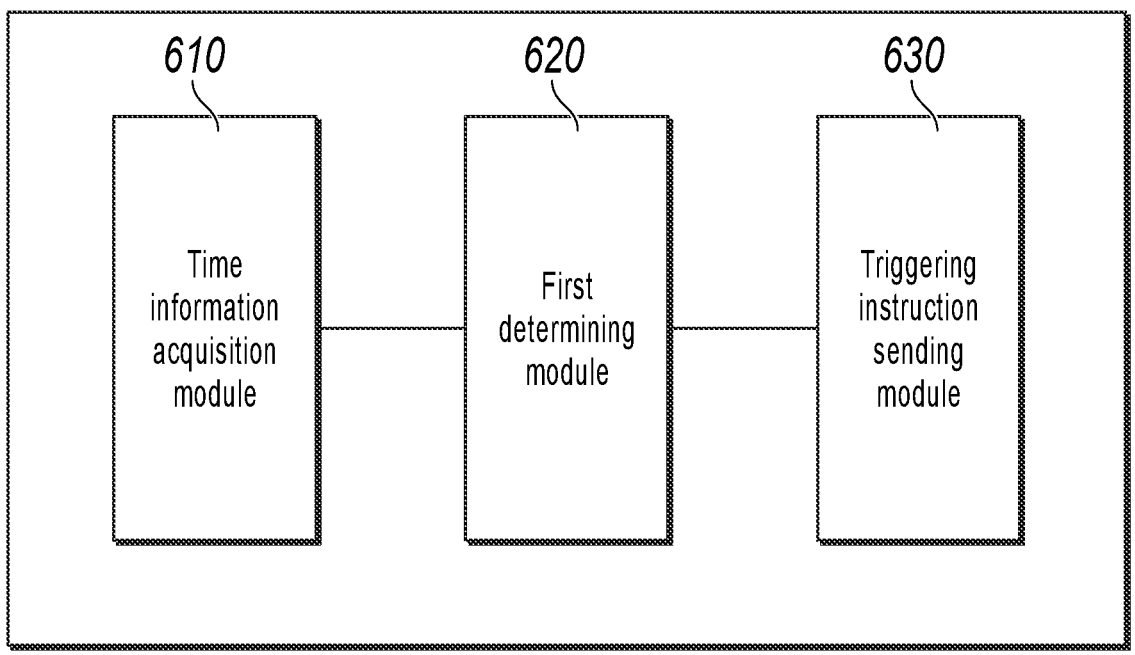
FIG. 6 is a schematic structural diagram illustrating an information sharing triggering apparatus, according to some embodiments of the present specification.

Based on the same idea, some embodiments of the present specification further provide an apparatus that corresponds to the previously-mentioned method Embodiment 2. FIG. 6 is a schematic structural diagram illustrating an information sharing triggering apparatus, according to some embodiments of the present specification. As shown in FIG. 6, the apparatus can include:

a time information acquisition module 610, configured to obtain time information used to indicate a current moment for an external server, where timed triggering logic is deployed on the external server;

a first determining module 620, configured to determine whether the time information satisfies a timed triggering rule in the timed triggering logic, to obtain a determining result; and a trigger instruction sending module 630, configured to send a trigger instruction to a privacy computing unit if the determining result indicates that the time information satisfies the timed triggering rule in the timed triggering logic, where the trigger instruction is used to trigger the privacy computing unit to combine first AML risk information provided by a first institution and second AML risk information provided by a second institution to obtain combined third AML risk information, where the combined first AML risk information and second AML risk information correspond to the same user identifier; and send the third AML risk information to the first institution.

Based on the apparatus in FIG. 6, some embodiments of the present specification further provide some specific implementations of the method, which are described below.

Optionally, the timed triggering rule can be triggered when timed duration reaches predetermined duration; or the timed triggering rule can be triggered when a current moment reaches a predetermined moment.

Optionally, the apparatus can further include:

a data amount acquisition module, configured to: if the determining result indicates that the time information does not satisfy the timed triggering rule in the timed triggering logic, obtain a data amount of data to be verified stored in a cloud storage server;

a data amount threshold determining module, configured to determine whether the data amount reaches a predetermined data amount threshold; and a trigger instruction sending module, configured to send a trigger instruction to the privacy computing unit if the data amount reaches the predetermined data amount threshold.

Based on the same idea, some embodiments of the present specification further provide a device that corresponds to the previously-mentioned method.

Figure 7:
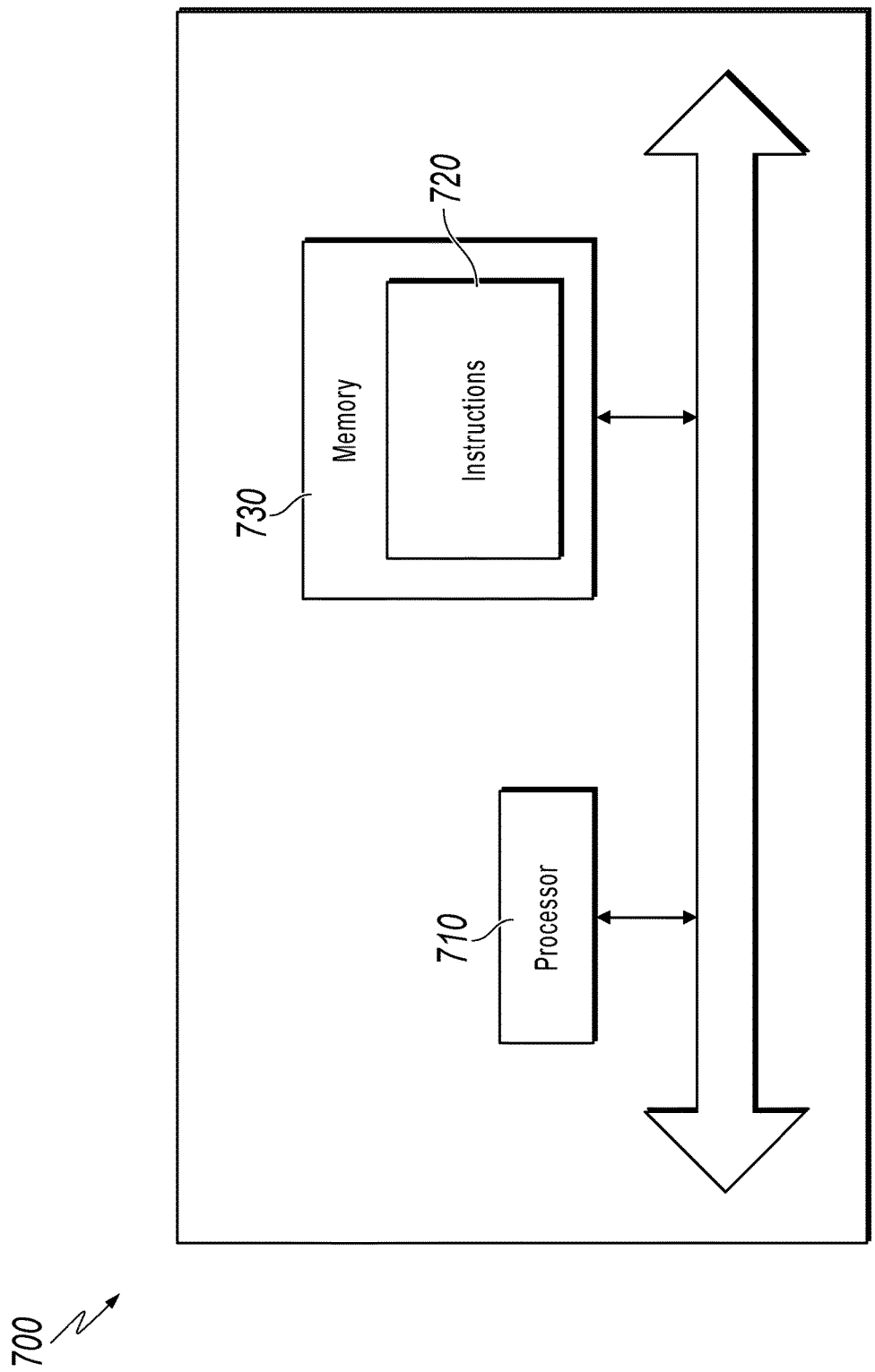
FIG. 7 is a schematic structural diagram illustrating an information sharing device, according to some embodiments of the present specification.

FIG. 7 is a schematic structural diagram illustrating an information sharing device, according to some embodiments of the present specification. As shown in FIG. 7, a device 700 can include:

at least one processor 710; and a memory 730 communicatively connected to the at least one processor; where the memory 730 stores instructions 720 that can be executed by the at least one processor 710, and the instructions are executed by the at least one processor 710.

Corresponding to Embodiment 1, in an information sharing device, the instructions 720 can enable the at least one processor 710 to:

obtain a trigger instruction sent by an external server;

in response to the trigger instruction, combine first AML risk information provided by a first institution and second AML risk information provided by a second institution to obtain combined third AML risk information, where the combined first AML risk information and second AML risk information correspond to the same user identifier; and send the third AML risk information to the first institution.

Corresponding to Embodiment 2, in an information sharing device, the instructions 720 can enable the at least one processor 710 to:

obtain time information used to indicate a current moment for an external server, where timed triggering logic is deployed on the external server;

determine whether the time information satisfies a timed triggering rule in the timed triggering logic, to obtain a determining result; and send a trigger instruction to a privacy computing unit if the determining result indicates that the time information satisfies the timed triggering rule in the timed triggering logic, where the trigger instruction is used to trigger the privacy computing unit to combine first AML risk information provided by a first institution and second AML risk information provided by a second institution to obtain combined third AML risk information, where the combined first AML risk information and second AML risk information correspond to the same user identifier; and send the third AML risk information to the first institution.

The embodiments in the present specification are described in a progressive way. For same or similar parts of the embodiments, references can be made to the embodiments. Each embodiment focuses on a difference from other embodiments. Particularly, the information sharing device or the information sharing triggering device in FIG. 7 is basically similar to the method embodiments, and therefore is described briefly. For related parts, references can be made to related descriptions in the method embodiments.

In the 1990s, whether a technical improvement is a hardware improvement (for example, an improvement of a circuit structure, such as a diode, a transistor, or a switch) or a software improvement (an improvement of a method procedure) can be clearly distinguished. However, as technologies develop, current improvements of many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the previously-mentioned several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previously-mentioned embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For convenience of description, the above apparatuses are described respectively in terms of their functions. Certainly, when the present specification is implemented, a function of each unit can be implemented in one or more pieces of software and/or hardware.

A person skilled in the art should understand that embodiments of the present disclosure can be provided as methods, systems, or computer program products. Therefore, the present disclosure can use a form of hardware only embodiments, software only embodiments, or embodiments with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the embodiments of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory may include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to: a phase change memory (PRAM), a static random access memory (SRAM), a dynamic random access memory (DRAM) or another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic tape/magnetic disk memory or another magnetic storage device, or any other non-transmission medium that can be used to store information that can be accessed by a computing device. Based on the definition in the present specification, the computer readable medium does not include transitory media such as a modulated data signal and carrier.

It is also worthwhile to note that terms "include", "contain" or any other variant is intended to cover non-exclusive inclusion, so processes, methods, products or devices that include a series of elements include not only those elements but also other elements that are not explicitly listed, or elements inherent in such processes, methods, products or devices. Without more constraints, an element preceded by "includes a . . . " does not preclude the existence of additional identical elements in the process, method, product or device that includes the element.

A person skilled in the art should understand that embodiments of the present specification can be provided as methods, systems, or computer program products. Therefore, the present specification can use a form of hardware only embodiments, software only embodiments, or embodiments with a combination of software and hardware. In addition, the present specification can use a form of a computer program product that is implemented on one or more computer-usable storage media (including but not limited to a disk memory, a CD-ROM, an optical memory, etc.) that include computer-usable program code.

The present specification can be described in the general context of computer executable instructions executed by a computer, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

The previously-mentioned descriptions are merely embodiments of the present specification, and are not intended to limit the present specification. A person skilled in the art can make various modifications and changes to the present specification. Any modification, equivalent replacement, or improvement made without departing from the spirit and principle of the present specification shall fall within the scope of the claims in the present specification.

What is claimed is:

1. A computer-implemented method, comprising:
   determining, by an off-chain computer, a starting moment to start a smart contract in the off-chain computer, wherein the smart contract is executable to initiate a combination of first anti-money laundering (AML) risk information generated by a first institution based on a first transaction analysis of user information and second AML risk information generated by a second institution based on a second transaction analysis of the user information;
   in response to determining that a current moment reaches the starting moment, obtaining, from an external server at a trusted execution environment (TEE) deployed on the off-chain computer, a trigger instruction;
   in response to obtaining the trigger instruction:
      receiving, at the TEE, the first AML risk information from the first institution and receiving, at the TEE, the second AML risk information from the second institution, wherein the first institution and the second institution are on-chain institutions; and
      performing, at the TEE, the combination of the first AML risk information and the second AML risk information to obtain third AML risk information, wherein the first AML risk information and the second AML risk information correspond to a same user identifier; and
   sending, from the TEE to the first institution, the third AML risk information.

2. The computer-implemented method of claim 1, wherein the trigger instruction is obtained based on a timed triggering rule comprising the starting moment to combine the first AML risk information and the second AML risk information.

3. The computer-implemented method of claim 1, wherein combining the first AML risk information and the second AML risk information comprises:
   obtaining a first user identifier corresponding to the first AML risk information;
   obtaining a second user identifier corresponding to the second AML risk information;
   in response to determining that the first user identifier and the second user identifier are same, combining the first AML risk information and the second AML risk information; and
   storing the third AML risk information.

4. The computer-implemented method of claim 3, wherein the first AML risk information comprises a first risk label, and the second AML risk information comprises a second risk label, and wherein combining the first AML risk information and the second AML risk information comprises:
   combining the first risk label and the second risk label to obtain a third risk label.

5. The computer-implemented method of claim 1, comprising:
   receiving, from the first institution at the TEE, a first sharing request, wherein the first sharing request comprises a first user identifier of a first user;

receiving, from the second institution at the TEE, a second sharing request, wherein the second sharing request comprises a second user identifier of a second user;

comparing, at the TEE, the first user identifier of the first user with the second user identifier of the second user; and in response to that the first user identifier matches the second user identifier, sending, to the first institution and the second institution from the TEE, the third AML risk information.

6. The computer-implemented method of claim 5, wherein the first sharing request is obtained by invoking the smart contract.

7. The computer-implemented method of claim 1, wherein the same user identifier comprises an account registered by a user at the first institution or assigned to the user by the first institution in response to the user initiating an operation at the first institution.

8. A non-transitory, computer-readable medium storing one or more instructions executable by a computer system to perform operations comprising:

determining, by an off-chain computer, a starting moment to start a smart contract in the off-chain computer, wherein the smart contract is executable to initiate a combination of first anti-money laundering (AML) risk information generated by a first institution based on a first transaction analysis of user information and second AML risk information generated by a second institution based on a second transaction analysis of the user information;

in response to determining that a current moment reaches the starting moment, obtaining, from an external server at a trusted execution environment (TEE) deployed on the off-chain computer, a trigger instruction;

in response to obtaining the trigger instruction:
  receiving, at the TEE, the first AML risk information from the first institution and receiving, at the TEE, the second AML risk information from the second institution, wherein the first institution and the second institution are on-chain institutions; and
  performing, at the TEE, the combination of the first AML risk information and the second AML risk information to obtain third AML risk information, wherein the first AML risk information and the second AML risk information correspond to a same user identifier; and sending, from the TEE to the first institution, the third AML risk information.

9. The non-transitory, computer-readable medium of claim 8, wherein the trigger instruction is obtained based on a timed triggering rule comprising the starting moment to combine the first AML risk information and the second AML risk information.

10. The non-transitory, computer-readable medium of claim 8, wherein combining the first AML risk information and the second AML risk information comprises:

obtaining a first user identifier corresponding to the first AML risk information;

obtaining a second user identifier corresponding to the second AML risk information;

in response to determining that the first user identifier and the second user identifier are same, combining the first AML risk information and the second AML risk information; and storing the third AML risk information.

11. The non-transitory, computer-readable medium of claim 10, wherein the first AML risk information comprises a first risk label, and the second AML risk information comprises a second risk label, and wherein combining the first AML risk information and the second AML risk information comprises:

combining the first risk label and the second risk label to obtain a third risk label.

12. The non-transitory, computer-readable medium of claim 8, wherein the operations comprises:

receiving, from the first institution at the TEE, a first sharing request, wherein the first sharing request comprises a first user identifier of a first user;

receiving, from the second institution at the TEE, a second sharing request, wherein the second sharing request comprises a second user identifier of a second user;

comparing, at the TEE, the first user identifier of the first user with the second user identifier of the second user; and in response to that the first user identifier matches the second user identifier, sending, to the first institution and the second institution from the TEE, the third AML risk information.

13. The non-transitory, computer-readable medium of claim 12, wherein the first sharing request is obtained by invoking the smart contract.

14. The non-transitory, computer-readable medium of claim 8, wherein the same user identifier comprises an account registered by a user at the first institution or assigned to the user by the first institution in response to the user initiating an operation at the first institution.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

determining, by an off-chain computer, a starting moment to start a smart contract in the off-chain computer, wherein the smart contract is executable to initiate a combination of first anti-money laundering (AML) risk information generated by a first institution based on a first transaction analysis of user information and second AML risk information generated by a second institution based on a second transaction analysis of the user information;

in response to determining that a current moment reaches the starting moment, obtaining, from an external server at a trusted execution environment (TEE) deployed on the off-chain computer, a trigger instruction;

in response to obtaining the trigger instruction:
  receiving, at the TEE, the first AML risk information from the first institution and receiving, at the TEE, the second AML risk information from the second institution, wherein the first institution and the second institution are on-chain institutions; and
  performing, at the TEE, the combination of the first AML risk information and the second AML risk information to obtain third AML risk information, wherein the first AML risk information and the second AML risk information correspond to a same user identifier; and sending, from the TEE to the first institution, the third AML risk information.

16. The computer-implemented system of claim 15, wherein the trigger instruction is obtained based on a timed triggering rule comprising the starting moment to combine the first AML risk information and the second AML risk information.

17. The computer-implemented system of claim 15, wherein combining the first AML risk information and the second AML risk information comprises:
   obtaining a first user identifier corresponding to the first AML risk information;
   obtaining a second user identifier corresponding to the second AML risk information;
   in response to determining that the first user identifier and the second user identifier are same, combining the first AML risk information and the second AML risk information; and
   storing the third AML risk information.

18. The computer-implemented system of claim 17, wherein the first AML risk information comprises a first risk label, and the second AML risk information comprises a second risk label, and wherein combining the first AML risk information and the second AML risk information comprises:
   combining the first risk label and the second risk label to obtain a third risk label.

19. The computer-implemented system of claim 15, wherein the one or more operations comprise:
   receiving, from the first institution at the TEE, a first sharing request, wherein the first sharing request comprises a first user identifier of a first user;
   receiving, from the second institution at the TEE, a second sharing request, wherein the second sharing request comprises a second user identifier of a second user;
   comparing, at the TEE, the first user identifier of the first user with the second user identifier of the second user; and
   in response to that the first user identifier matches the second user identifier, sending, to the first institution and the second institution from the TEE, the third AML risk information.

20. The computer-implemented system of claim 19, wherein the first sharing request is obtained by invoking the smart contract.

* * * * *